United States Patent [19]

Guisinger et al.

[11] Patent Number: 4,868,686

[45] Date of Patent: Sep. 19, 1989

[54] METHOD AND SYSTEM FOR RECORDING ASYNCHRONOUS BIPHASE ENCODED DATA ON A VIDEO TAPE RECORDER AND FOR RECOVERING THE ENCODED RECORDED DATA

[75] Inventors: Barrett E. Guisinger, Saratoga; Bruce E. Busby, Los Altos, both of Calif.

[73] Assignee: Sony Corporation, Tokyo, Japan

[21] Appl. No.: 308,892

[22] Filed: Feb. 9, 1989

[51] Int. Cl.4 ............................................. G11B 5/008
[52] U.S. Cl. ........................................ 360/8; 358/319;
358/310; 358/12; 360/51; 360/33.1
[58] Field of Search ...................... 360/8, 51, 42, 37.1,
360/33.1; 358/319, 310, 335, 12, 148, 150

[56] References Cited

U.S. PATENT DOCUMENTS

| | | | |
|---|---|---|---|
| 3,878,335 | 4/1975 | Baloban | 358/148 |
| 4,122,477 | 10/1978 | Gallo | 358/150 |
| 4,464,679 | 8/1984 | Wargo | 358/148 |
| 4,635,138 | 1/1987 | Louth | 360/73.01 |
| 4,794,453 | 12/1988 | Gnuechtel | 358/148 |

*Primary Examiner*—Vincent P. Canney
*Assistant Examiner*—Kevin J. Fournier
*Attorney, Agent, or Firm*—Philip M. Shaw, Jr.

[57] ABSTRACT

A method and system for recording an asynchronous, biphase encoded signal (such as a MIL-STD-1553B signal), having a first data rate, on a video tape recorder, which may be a consumer video tape recorder, and for recovering the encoded recorded data for subsequent transmission in its original format. The asynchronous biphase enceded signal is synchronized with a clock signal having frequency equal to twice the first data rate. The synchronized signal is then stored temporarily in a buffer memory as if it were an NRZ bit stream having bit rate equal to twice the first data rate. The data is read out of memory and combined with television-type synchronization pulses to produce a television-type signal for recording on the VTR. In the play back mode, the recorded VTR signal is separated into its data component (which consists of bursts of data that occupied the active video areas) and sync component. The invention eliminates the need to use specially designed recorders for asynchronous biphase encoded signals. Such specially designed recorders are typically expensive and have limited available record time.

29 Claims, 9 Drawing Sheets

METHOD AND SYSTEM FOR RECORDING ASYNCHRONOUS BIPHASE ENCODED DATA ON A VIDEO TAPE RECORDER AND FOR RECOVERING THE ENCODED RECORDED DATA

FIELD OF THE INVENTION

The invention is a method and system for recording asynchronous biphase encoded data (such as data in the U.S. Government MIL-STD-1553B format) on a consumer video tape recorder, and for recovering the encoded recorded data for subsequent transmission in its original format.

BACKGROUND OF THE INVENTION

The communication bus known as MIL-STD-1553B (sometimes also denoted herein as "Manchester 1553B") is a communication bus utilized for machine control applications. MIL-STD-1553B signals have a Manchester II biphase level data code, and a transmission bit rate of 1.0 megabits per second. While originally developed for aircraft control, the bus has been adopted by many other users and is quickly becoming a widely used standard. There is a need for a cost effective means for recording Manchester 1553B format data.

Historically, users have resorted to very expensive, specially designed recorders for recording Manchester 1553B data (and other asynchronous, biphase encoded data). The recording time available on such conventional, specially designed recorders has been limited, typically to about fifteen minutes.

SUMMARY OF THE INVENTION

Recognizing that Manchester 1553B signals are transmitted asynchronously at a fixed rate and are biphase encoded signals, the inventive system encodes Manchester 1553B signals so that they emulate standard television signals. The encoded signals may then be recorded on, and played back from, a commercially available video tape recorder (VTR). The inventive system may be connected to such a VTR to process the encoded, recorded signals upon playback, so that they may be re-transmitted in their original 1553B format. While recording and recovering Manchester 1553B signals is an important application of the invention, it is contemplated that other asynchronous biphase encoded signals may be recorded and recovered using alternative embodiments of the inventive system.

The system of the invention includes a record processor and a playback processor. The record processor includes a receiver for receiving asynchronous, biphase encoded data having a first data rate and means for synchronizing the received asynchronous encoded data, and writing it into a buffer memory as if it were an unencoded NRZ bit stream having a second data rate equal to twice the first data rate. A crystal clock, in concert with a voltage controlled oscillator, is used to generate television-type synchronization pulses which are combined with the undecoded data stored in the buffer memory to create an appropriately timed, composite, television-type signal (for example, one having NTSC format) suitable for recording on a standard VTR (for example, one capable of recording and playing back television signals having NTSC format). In effect, the data temporarily stored in the buffer memory is encoded into black and white DC levels for recording as a video signal, with the data being placed in the active video area.

To recover the original biphase encoded signal, a reverse process is employed. The recorded television-type signal is played back from the VTR, and the playback processor separates the television-type signal into its data and video components. Black and white levels in the separated data components are converted to TTL logic level. This bit stream is then temporarily stored in a buffer memory since the data is each active video area represents a small, non-continuous burst of data, not the original data stream. The original data stream is clocked out of the buffer memory (preferably by a crystal-based oscillator) at the second data rate. The signal emerging from the playback processor's buffer memory has data content and format identical to the original biphase encoded signal, and may be sent to a transmitter for transmission in the original format.

The inventive technique accurately reproduces errors in the original signal, and eliminates the need to decode the biphase encoded signal prior to recording it. Rather, the biphase encoded signal (having a first data rate) is recorded as if it were an un-encoded NRZ bit stream having twice the first data rate.

DETAILED DESCRIPTION OF THE PREFERRED EMBODIMENTS

For simplicity, only embodiments of systems according to the invention that are specifically designed to process asynchronous signals in the conventional MIL-STD-1553B format will be described in detail with reference to the drawings. However, it will be apparent from this disclosure to those of ordinary skill in the art that the method of the invention may also be embodied in systems that are capable of processing other types of asynchronous, biphase encoded signals, including signals having any of a wide range of data rates.

The record processor portion of a preferred embodiment of the inventive system will be described generally with reference to FIG. 1, and then more specifically with reference to FIGS. 3, 7, 8, and 9. The playback portion of the same preferred embodiment of the inventive system will be described generally with reference to FIG. 2, and then more specifically with reference to FIGS. 4, 5, 7, 8, and 9. The record and playback portions include many of the same types of components. Therefore, although in principle they could be constructed separately as discrete systems, it is most efficient to implement them as a combined record-playback system in which the record and playback portions share numerous circuit elements. Thus, the preferred embodiment described with reference to FIGS. 3 through 5, and 7 through 9, is such a combined record-playback system. An alternative embodiment of the inventive system, in which the record and playback portions are not combined, will be discussed with reference to FIG. 6.

Figure 1:
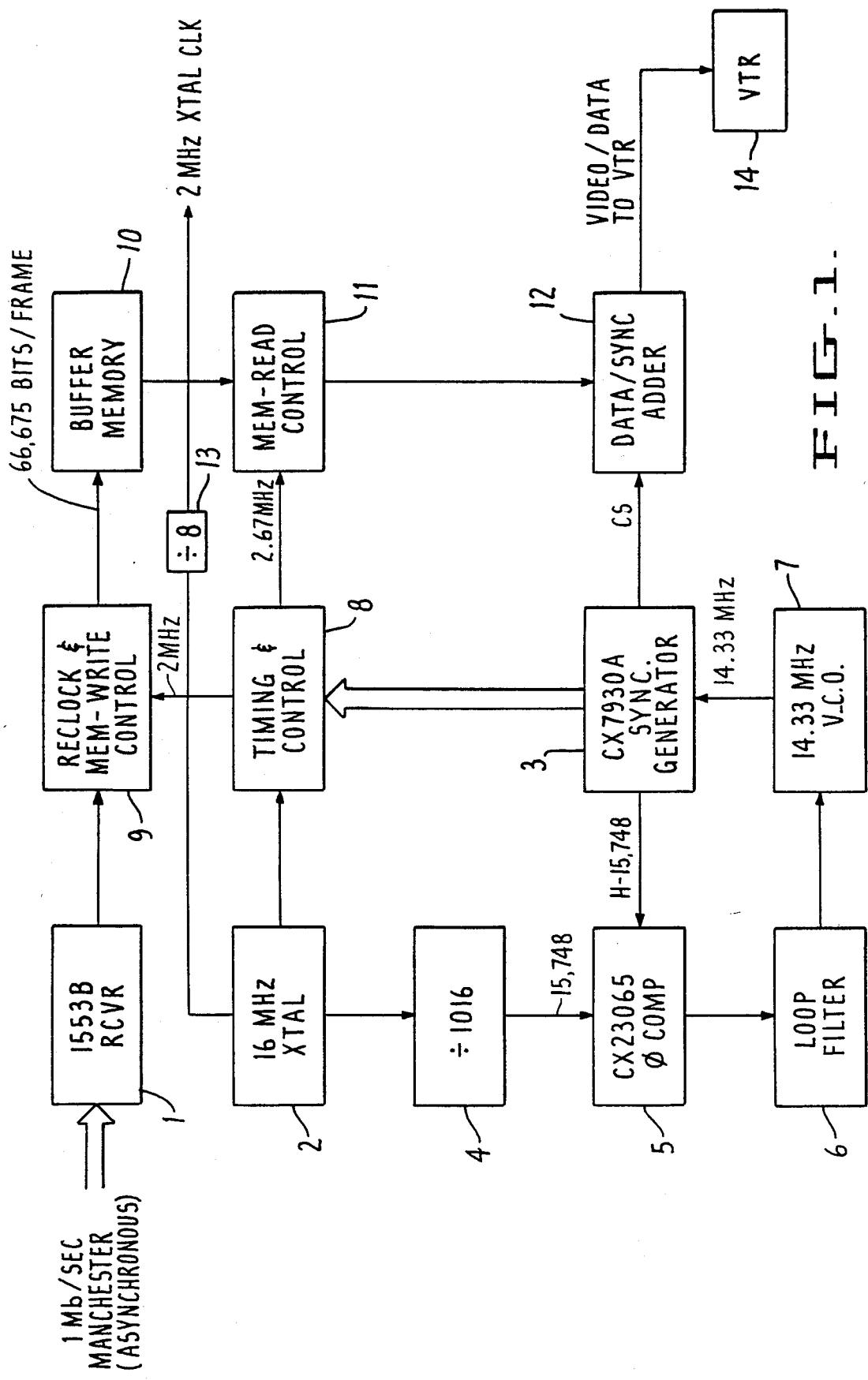
FIG. 1 is a block diagram of one preferred embodiment of a system embodying the invention in its "record" mode, in which it receives Manchester 1553B data and records the data in video format.

The FIG. 1 block diagram illustrates the structure and function of the inventive system in its record mode. The asynchronous 1553B signal is received by 1553B receiver 1 and sent to reclock and memory write control element 9. Unit 9 synchronizes the 1553B signal with a crystal clock-derived 2 MHz clock signal and directs the synchronized signal to buffer memory 10. The data stored in memory 10 are equivalent to 66,675 bits of unencoded NRZ data per frame of a video signal with field frequency equal to 29.996 Hz (not 29.970 Hz), and a horizontal sweep rate of 15,748 Hz.

Timing and control unit 8 and memory read control unit 11 supply the necessary signals for reading bursts of data from memory 10 with appropriate timing so that the data read from memory 10 emulates a standard television-type signal, which may for example be suitable for recording on a NTSC format video tape recorder. When read out of the buffer memory, the originally recorded bits are compressed by the ratio (2.0 Megabits per second)/(2.67 Megabits per second) to allow for addition of sync and blanking. A composite sync signal from sync generator 3 is added in adder 12 to the signal emerging from memory 10. The television-type signal emerging from adder 12 may be recorded in conventional VTR 14.

A 16 MHz crystal clock 2 supplies a 16 MHz signal to frequency divider 4, which divides the frequency of the 16 MHz signal by the factor 1016, and outputs a 15,748 Hz signal to phase comparator 5. The feedback loop including phase comparator 5, loop filter 6, 14.33 MHz voltage-controlled oscillator 7, and sync generator 3 permits sync generator 3 to output appropriate frequency-stabilized sync and blanking pulses to timing and control unit 8 and to adder 12. Crystal clock 2 also supplies a 16 MHz signal directly to timing and control unit 8, and supplies a 16 MHz signal to frequency divider 13. The 2 MHz signal emerging from divider 13 is available for use by memory read control unit 25 of the playback processor (to be discussed below with reference to FIG. 2).

Figure 2:
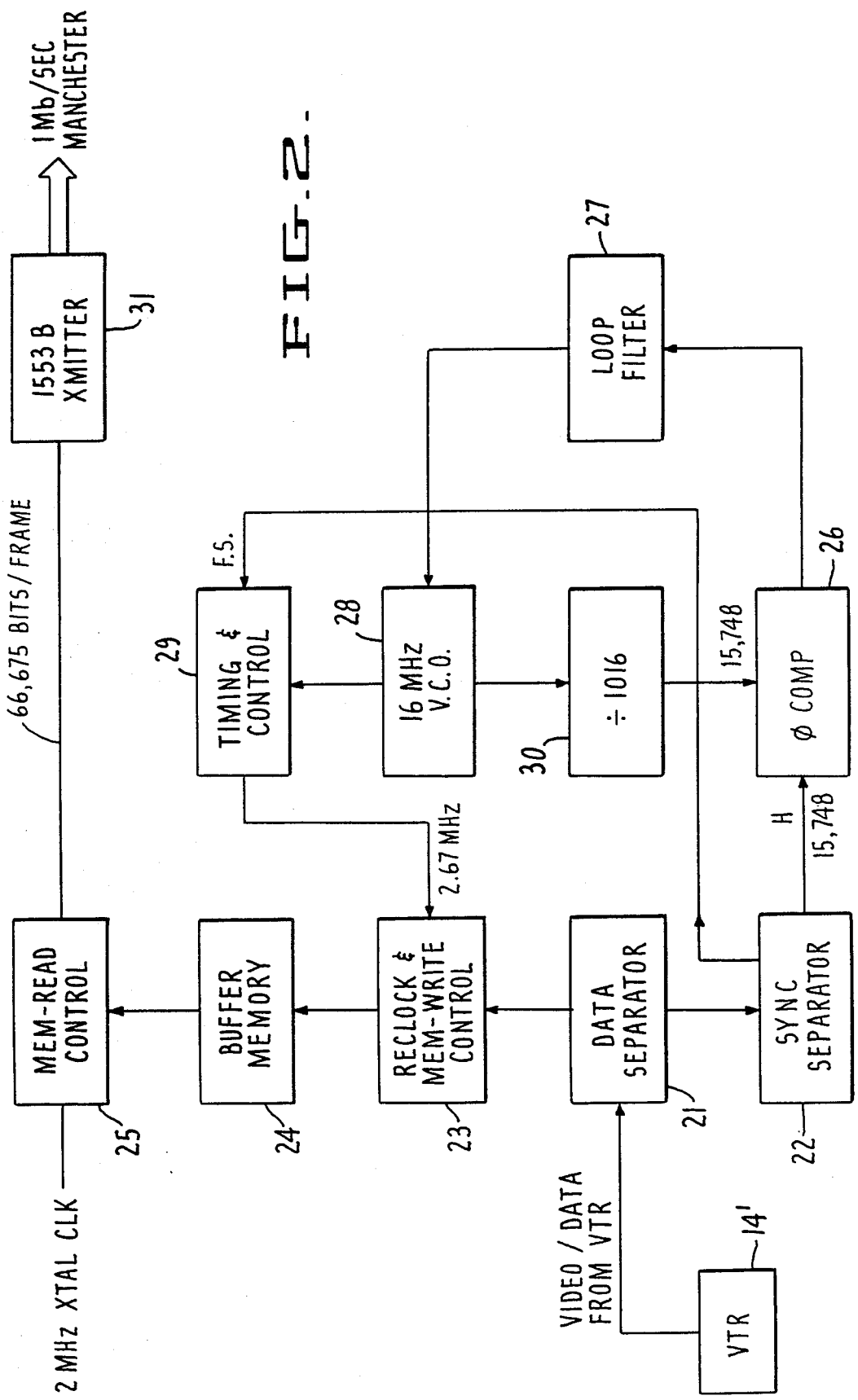
FIG. 2 is a block diagram of the FIG. 1 system in its "playback" mode, in which the system reconstructs the original 1553B signal from the recorded video signal.

The FIG. 2 block diagram illustrates the structure and function of the inventive system in its playback mode. VTR 14' (which may be the same VTR as VTR 14 of FIG. 1, but need not be) plays back a recorded television-type signal of the type that has emerged from adder 12 of FIG. 1. This signal includes television-type sync and blanking pulses, and 2.67 Mbit/sec undecoded data within each active video area. The played back signal is separated into its data components (the bit streams that occupy the active video regions) and sync components in data separator 21 and sync separator 22. The data components emerging from unit 21 are clocked into buffer memory 24 by reclock and memory write control unit 23, in response to 2.67 MHz timing and control signals from timing and control unit 29. The data temporarily stored in buffer memory 24 is then clocked out of buffer memory 24 by 2 MHz crystal clock-based signals emerging from memory read control unit 25. Memory read control unit 25 supplies data from buffer memory 24 to transmitter 31 at precisely 66,675 bits per frame and at a 2.0 Mbit/sec rate. The original data that entered 1553B receiver 1 may thus be transmitted in its original format from transmitter 31, after it has been recorded on, and played back from, VTR 14. An example of a suitable commercial VTR that may be used for recording and playback with the inventive system is the Sony Model EV-C8 VTR.

16 MHz signal from VCO 28 is frequency divided in frequency divider 30, so that a 15,748 Hz clock signal emerges from divider 30 and enters phase comparator 26. 15,748 Hz sync pulses emerging from separator 22 similarly enter comparator 26. The feedback loop comprising comparator 26, loop filter 27, 16 MHz VCO 28, and frequency divider 30 permits VCO 28 and sync separator 22 to output appropriate frequency stabilized sync pulses and clock signals, that are synchronized with the data pulses emerging from separator 21, to timing and control unit 29. Unit 29 in turn supplies timing and control signals to unit 23, so that the data occupying the active video areas of the VTR signal (a series of short, discontinuous data bursts) may be clocked into buffer memory 24.

Because conventional VTRs of the type contemplated for use with the inventive system will be locked to their own internal crystals, there will be "slip" between the input data rate to buffer memory 24 and the output data rate, even if the internal crystal of the playback VTR generates clock signals having frequency that closely matches the record processor H rate (the record processor H rate is 15,748 Hz). This may result in the buffer emptying or overfilling. To prevent such slipping, the playback VTR is preferably locked to the record processor during playback.

Figure 3:
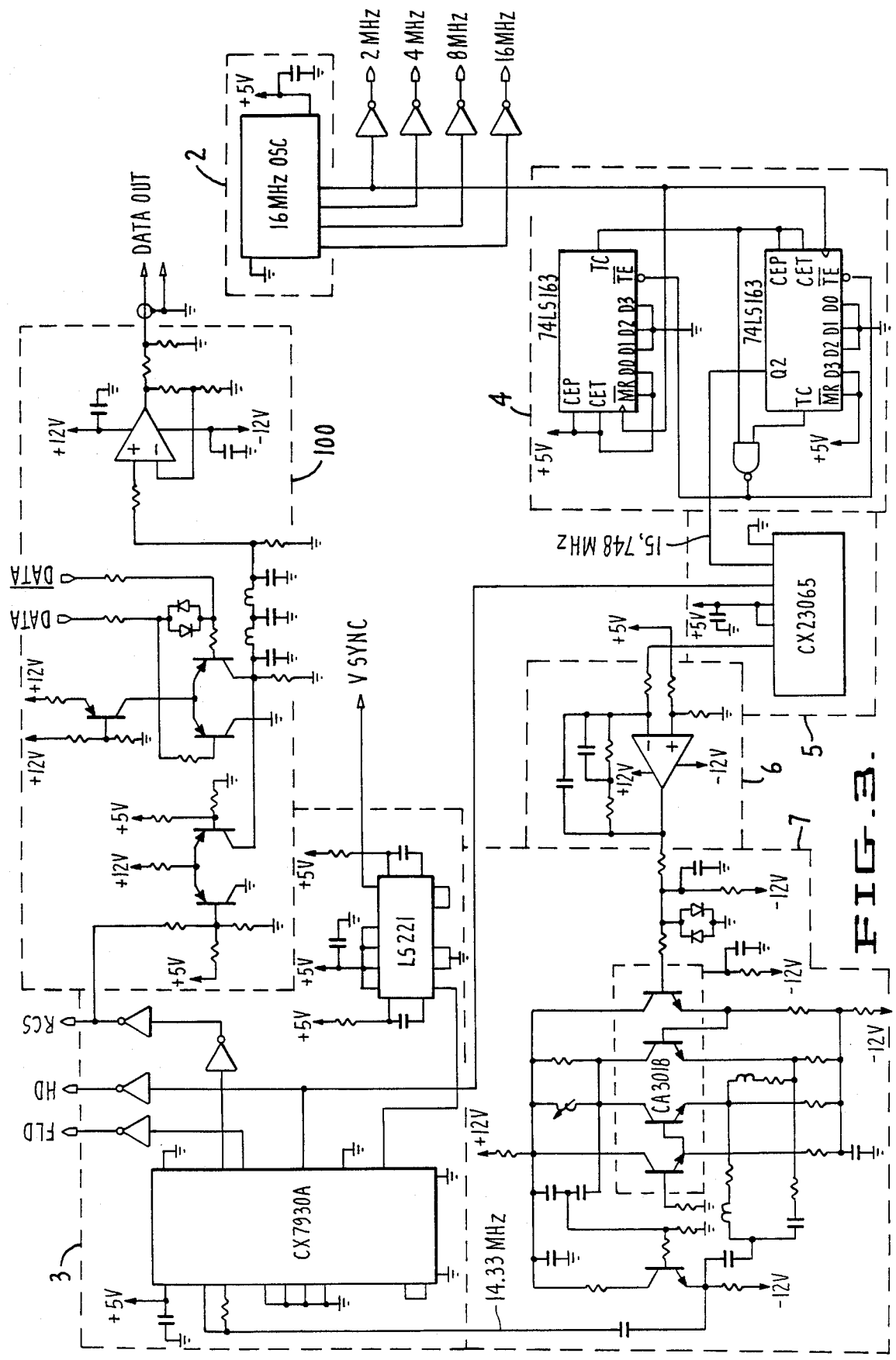
FIG. 3 is a circuit diagram of the analog circuit elements of the record processor of a system according to the invention in its FIG. 1/FIG. 2 embodiment.

FIG. 3 shows the analog circuit elements associated with the record processor portion of the preferred embodiment of the inventive system described generally with reference to FIG. 1. The circuitry within box 3 of FIG. 3 corresponds to sync generator 3 of FIG. 1. The circuitry within box 3 outputs the following frequency stabilized signals: FLD, a periodic sync signal having frequency (29.996 Hz) corresponding to that of the first lines of the frames of the played back video signal; HD, a periodic sync signal having frequency 15,748 Hz (corresponding to the horizontal sweep rate of the video signal); VSYNC, a periodic sync signal having frequency (59.992 Hz) corresponding to the vertical sweep rate of a video signal; and RCS, a 2 MHz record clock signal.

Similarly, the circuitry within box 2 of FIG. 3 corresponds to crystal clock 2 of FIG. 1; the circuitry within box 4 of FIG. 3 corresponds to frequency divider 4 of FIG. 1; the circuitry within box 5 of FIG. 3 corresponds to comparator 5 of FIG. 1; the circuitry within box 6 of FIG. 3 corresponds to loop filter 6 of FIG. 1; and the circuitry within box 7 of FIG. 3 corresponds to 14.33 MHz V.C.O. 7 of FIG. 1. Thus, frequency divider 4 outputs a 15,748 Hz clock signal, derived from crystal clock 2, to comparator 5.

The flip-flop circuitry within box 100 of FIG. 3 corresponds to the reclocking circuitry within "reclock and memory write control unit" 9 of FIG. 1. The asynchronous 1553B data (a data signal and the inverse signal thereto) received by receiver 1 is synchronized by the circuitry in box 100 with the stabilized 2 MHz record clock signal (designated as "RCS") emerging from synchronization signal generator 3, so that synchronized 1553B data (which is treated as if it were 2 Mbit/sec NRZ data) emerges as the output of the circuitry of box 100. Sync generator 3 comprises a conventional CX7930A integrated circuit.

Figure 4:
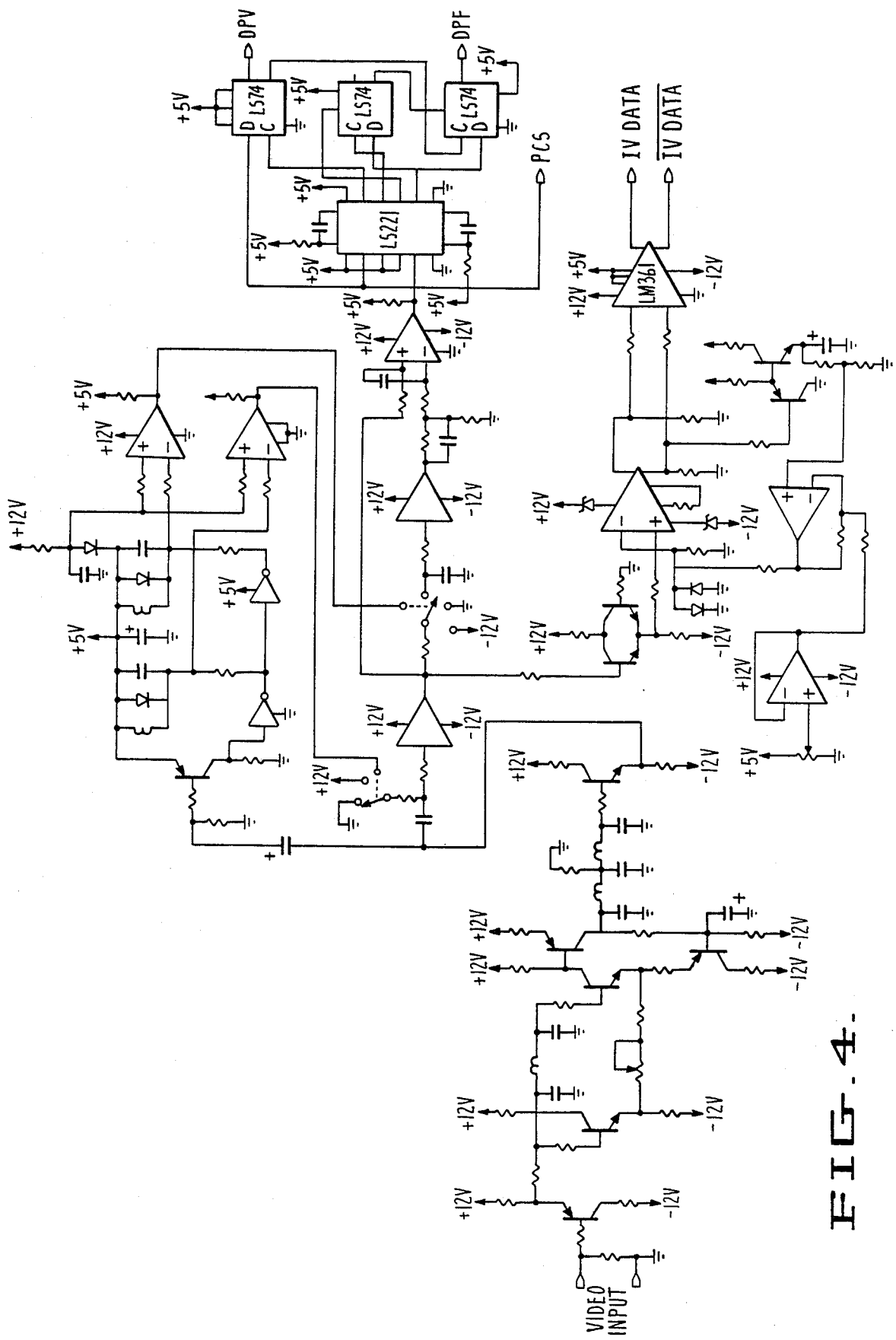
FIG. 4 is a circuit diagram of analog circuit elements comprising the playback processor of a system according to the invention in its FIG. 1/FIG. 2 embodiment.

FIG. 4 shows the analog circuit elements corresponding to data separator 21, and a portion of sync separator 22, of FIG. 2. The video input to the FIG. 4 circuitry is the recorded television-type signal from the record processor after that recorded signal has been played back from VTR 14'. The data separator portion of the FIG. 4 circuitry outputs data signals IVDATA and $\overline{\text{IVDATA}}$ (the inverse signal to the "IVDATA" signal), each of which consists of bursts of 2.67 Mbit/sec data that had occupied the active video areas of the video input signal. The portion of the sync separator shown in FIG. 4 generates the following signals from the video input: DPV, a 59.996 Hz signal indicative of the vertical sync pulses of the video input; DPF, a 29.996 Hz signal indicative of the frame pulses of the video input; and PCS, a 2.67 MHz playback clock signal derived from the video input.

Figure 5:
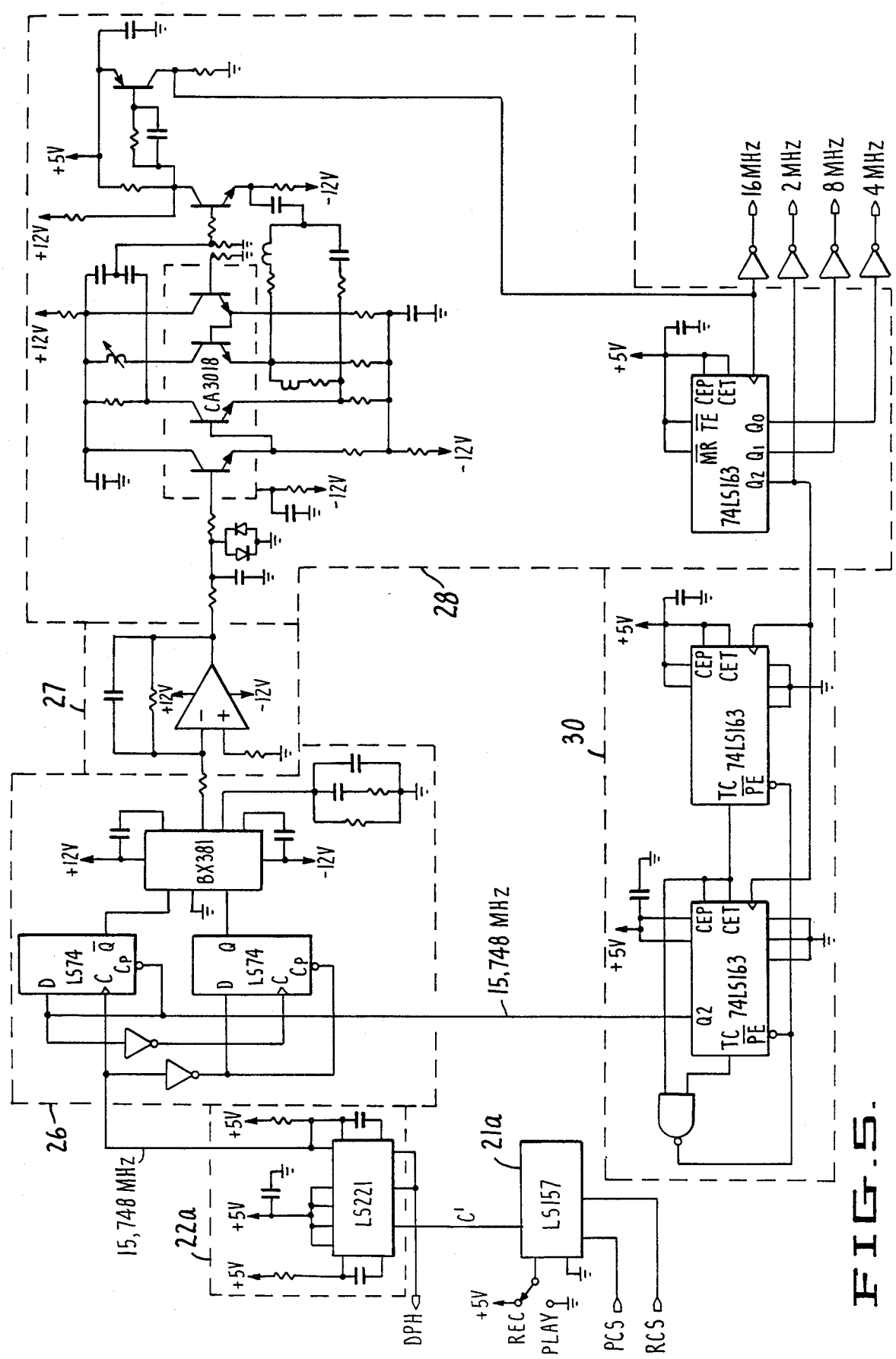
FIG. 5 is a circuit diagram of the analog circuit elements of the playback voltage-controlled oscillator (VCO) of the playback processor of the invention in its FIG. 1/FIG. 2 embodiment.

FIG. 5 shows the analog circuit elements corresponding to the portion of sync separator 22 not shown in FIG. 4, and to 16 MHz VCO 28, frequency divider 30, phase comparator 26, and loop filter 27 of FIG. 2. The circuitry within box 22a of FIG. 5, together with the FIG. 4 circuit, comprises data separator 21 and sync separator 22. Horizontal sync circuitry 22a receives clock signal C' from integrated circuit 21a, and generates signal DPH. Signal DPH has frequency equal to 15,748 Hz, and is indicative of the horizontal sync pulses of the video input. The circuitry within box 22a also outputs a 15,748 Hz signal to phase comparator 26, and comparator 26 receives the 15,748 Hz signal output by frequency divider 30.

Integrated circuit 21a receives 2.67 MHz playback clock signal "PCS" from the FIG. 4 circuit, and 2 MHz record clock signal "RCS" from sync generator 3 of FIG. 3. In the playback mode, IC 21a derives clock signal C' from signal PCS. In the record mode, IC 21a derives clock signal C' from signal RCS.

The circuitry within box 28 corresponds to 16 MHz VCO 28 of FIG. 2, and the circuitry within box 27 corresponds to loop filter 27 of FIG. 2.

The sync signals (DPH, DPV, and DPF) and the clock signals output from the FIG. 4 and FIG. 5 circuitry are employed in timing and control unit 29 (in a manner to be described below) to generate 2.67 MHz timing and control signals for use (by reclock and memory write control unit 23) in writing the bursts of data comprising playback data signal IVDATA into buffer memory 24. As shown in FIG. 2, memory read control unit 25 (whose functioning will be discussed below) outputs 2 MHz control signals (derived from the 2 MHz crystal clock signal received from crystal clock 2 of FIG. 1, via frequency divider 13) to read the stored data out of memory 24.

Figure 6:
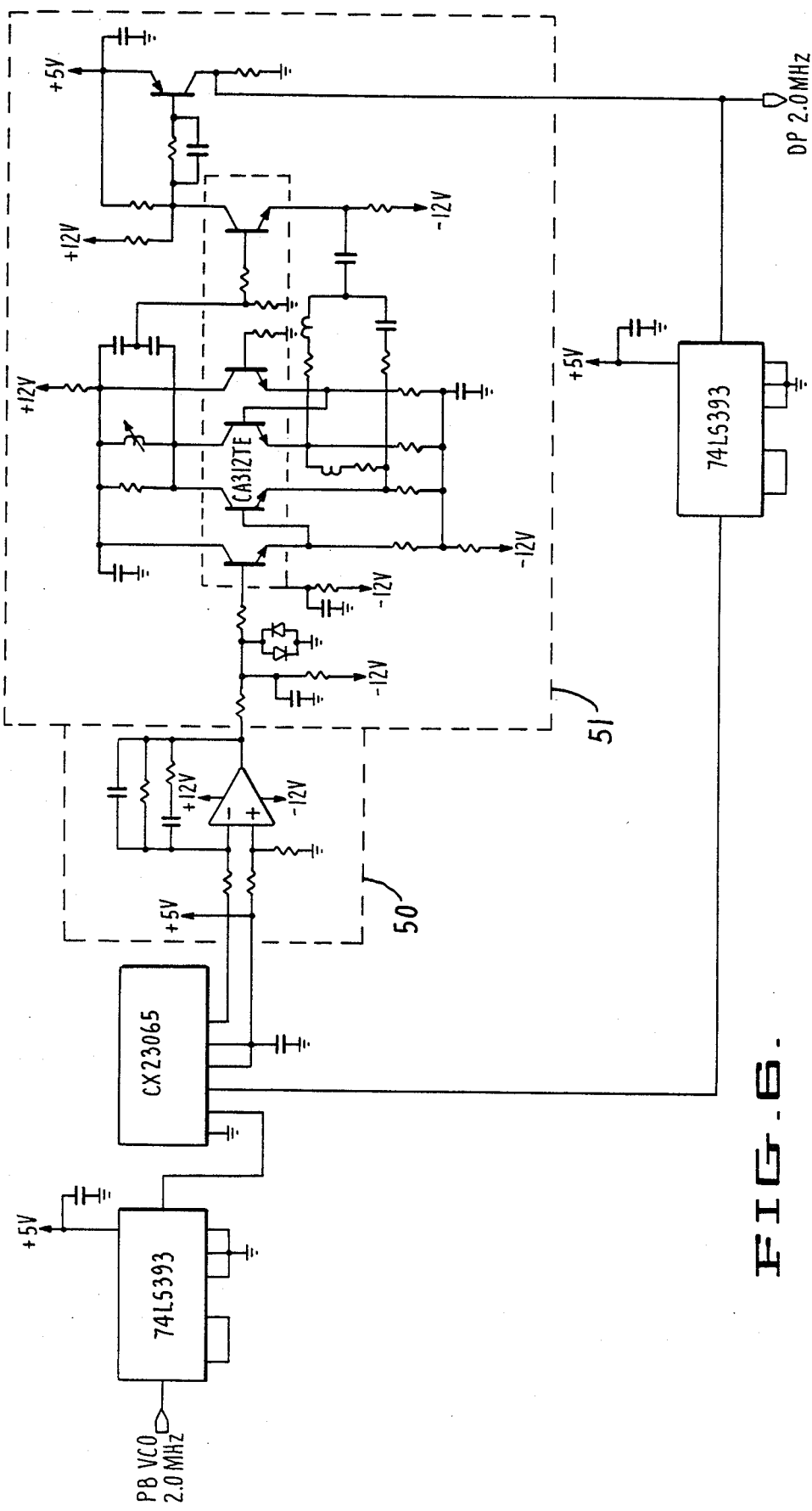
FIG. 6 is a circuit diagram of the analog circuit elements of the playback output clock of another preferred embodiment of the playback processor of the invention.

Alternatively, memory read control unit 25 may derive its output, not from such a crystal clock signal, but instead from a frequency stabilized clock signal derived from VCO 28. FIG. 6 shows analog circuitry capable of receiving the 2 MHz signal emerging from VCO 28 (element 28 of FIG. 5), and generating such a frequency stabilized 2 MHz output signal (denoted as "DP 2.0 MHz" in FIG. 6) for use by memory read control unit 25. The FIG. 6 circuit includes two 74LS393 frequency dividers that supply common frequency signals to phase comparator CX23065; voltage controlled oscillator 51; and loop filter 50, connected in series between comparator CX23065 and voltage controlled oscillator 51. In an alternative embodiment of the inventive system that includes the FIG. 6 circuit, the playback circuitry of FIG. 5 is modified so that horizontal sync circuit element 22a is driven by playback clock signal PCS alone. In this embodiment, all necessary timing, control, and clock signals are internally generated by the playback processor (or are extracted by the playback processor from the video signal played back by the VTR). Accordingly, in this embodiment, the playback processor may be decoupled from the record processor, and if desired, housed separately from the record processor.

Figure 7:
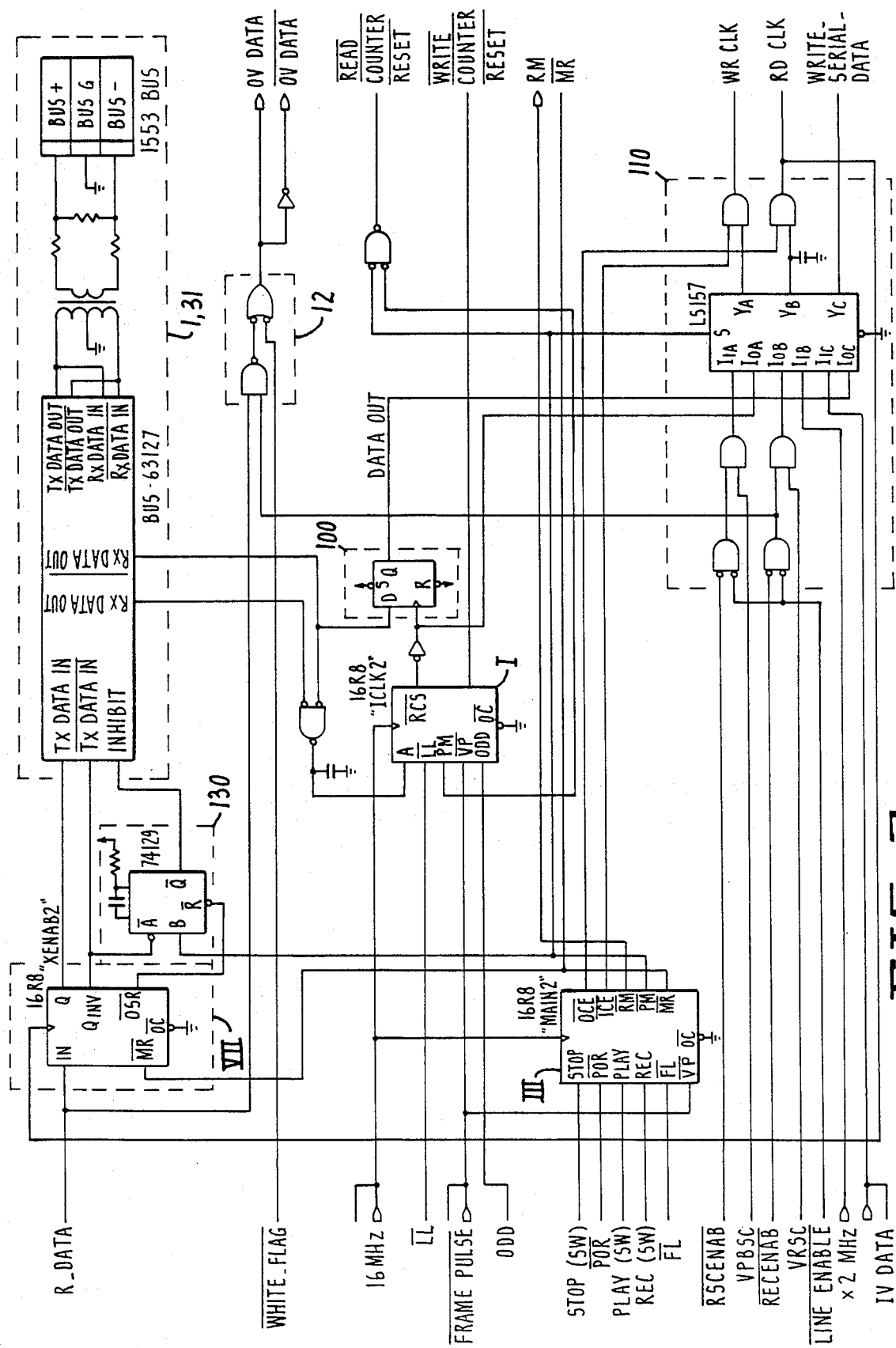
FIG. 7 is a circuit diagram of the digital elements of a first portion of the FIG. 1/FIG. 2 embodiment of the invention, showing timing and control signal flow and data flow.
Figure 8:
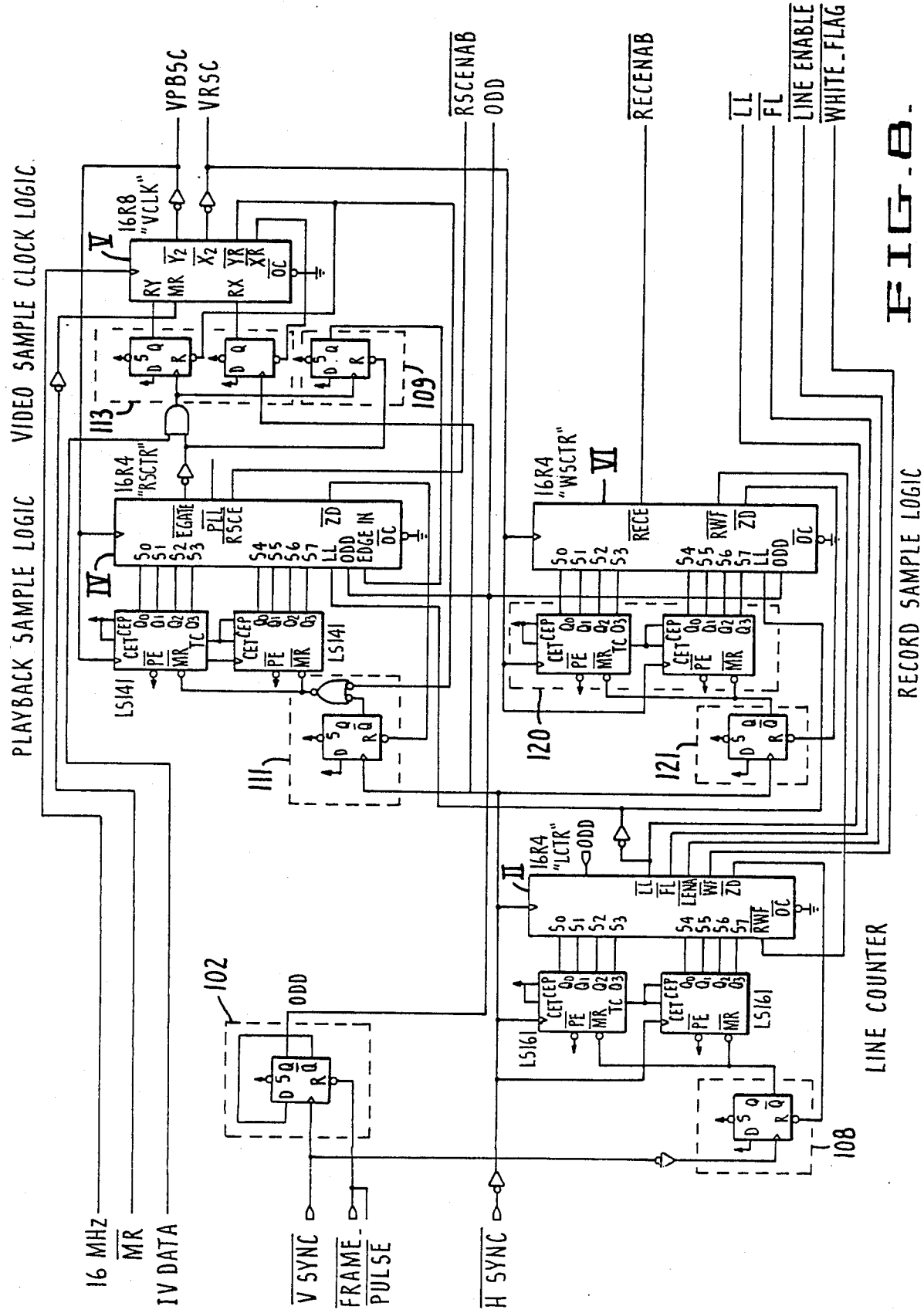
FIG. 8 is a circuit diagram of the digital elements of a second portion of the FIG. 1/FIG. 2 embodiment of the invention, showing timing and control signal flow and data flow.
Figure 9:
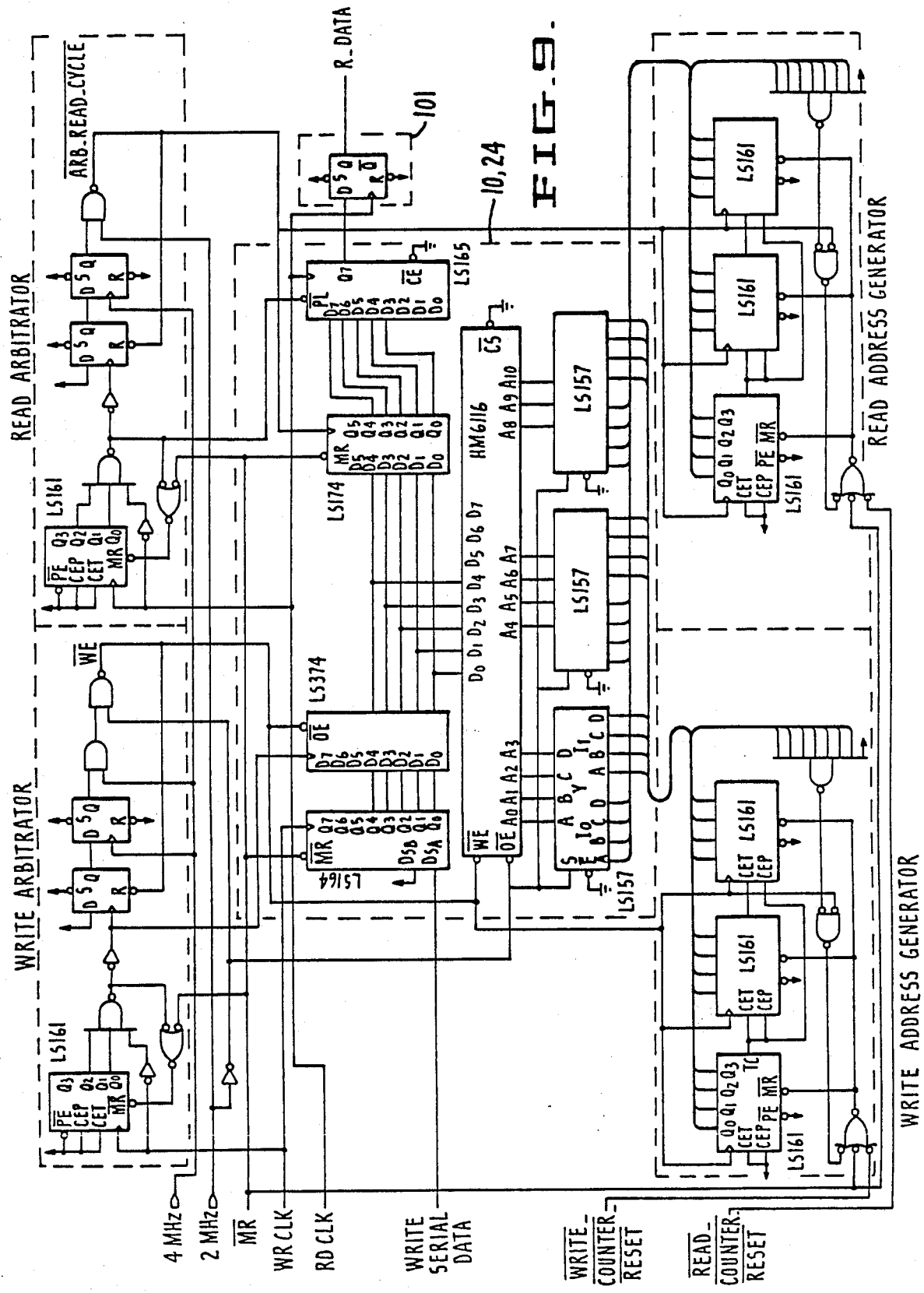
FIG. 9 is a circuit diagram of the digital elements of a third portion of the FIG. 1/FIG. 2 embodiment of the invention (which includes the buffer memory), showing timing and control signal flow and data flow.

We shall next describe the timing and control signal flow of the FIG. 1/FIG. 2 embodiment with reference to FIGS. 7, 8 and 9. 1553B receiver/transmitter 1,31 of FIG. 7 corresponds to both receiver 1 of FIG. 1 and transmitter 31 of FIG. 2. As shown in FIG. 7, data received by unit 1,31 (the "$R_x$ DATA" signal) is output to integrated circuit LS74 (identified by numeral 100 in FIG. 7), which corresponds to circuit 100 of FIG. 3, where it is synchronized with the inverse of 2 MHz read clock signal $\overline{\text{RCS}}$ emerging from integrated circuit "I" (to be described below). The synchronized 2 MHz "DATA OUT" signal emerging from circuit 100 is supplied to sampler integrated circuit LS157, from which it is output at appropriate times (as "WRITE SERIAL DATA") to buffer memory 10,24 of FIG. 9 (buffer memory 10,24 of FIG. 9 corresponds to memory 10 of FIG. 1 and memory 24 of FIG. 2). Data stored in memory 10,24 is clocked out of memory by read clock signal "RDCLK," in flip flop integrated circuit LS74 enclosed by box 101 in FIG. 9. The RDCLK signal will have frequency 2 MHz when the system is in the playback mode, and will have frequency 2.67 MHz when the system is in the record mode. The data emerging from the circuitry of box 101 is denoted "R DATA." In the system's record mode, R DATA is added to sync pulse signal "$\overline{\text{WHITE FLAG}}$" by the addition circuitry within box 12 of FIG. 7. Each white flag pulse is followed by 141 samples of real data (except when the last horizontal line is being output, in which case the white flag pulse is followed by 61 samples for an even field and 62 samples for an odd field). The television-type signal emerging from adder 12 is denoted "OV DATA" in FIG. 7. OV DATA, and its inverse "$\overline{\text{OV DATA}}$, are supplied to a VTR, where they are recorded.

In the system's playback mode, data ("IVDATA") separated from the played back video signal is supplied to sampler IC LS157, and is then written into buffer memory 10,24 by appropriately timed control signals. The stored data is then read from the buffer memory as "R DATA," then emerges from the "transmit enable resetter" IC (denoted as IC "VII" in FIG. 7), and enters 1553B transmitter/receiver 1,31, from which it may be transmitted.

The model 16R8 integrated circuit identified by numeral III in FIG. 7 is the main state machine for in the system, and will sometimes be referred to below as the "main state machine." The main state machine receives the following input signals from the VTR: STOP, an active high stop pulse; REC, an active high record pulse; PLAY, an active high play pulse; $\overline{POR}$, an active low power-on reset; and receives the following additional input signals: $\overline{FL}$, an active low first line flag from line counter logic element II (to be discussed below); $\overline{FRAME\ PULSE}$, an active low frame pulse which is the inverse of frame pulse signal FLD from sync generator 3 during the recording mode (and is the inverse of frame pulse signal DPF from the FIG. 4 circuitry during the playback mode); and C, a 16 MHz crystal clock signal.

During startup in the record mode, the clock enables are set and the system remains in the record mode waiting for arrival of the STOP, $\overline{POR}$, or PLAY signal. During startup in the play mode, the write-address counters are reset during the vertical interval. In the play mode, it is necessary to wait for the entirety of the first (horizontal) line of data (141 samples) to have been written to RAM before enabling the 2 MHz RD CLK signal. The signals output by the main state machine are the following: $\overline{FLL}$, a first-line-latched signal (latched to the input signal $\overline{FL}$) used internally to avoid 16 MHz sampling furr (races); $\overline{FLDE}$, a first-line-latched-delayed signal (a delayed version of the signal $\overline{FLL}$) used internally with $\overline{FLL}$ to detect the falling edge of $\overline{FL}$; $\overline{MR}$, an active low master reset signal; OCE, an active high output clock enable signal that, when active, allows the passage of the RD CLK signal (OCE is set on $\overline{FL}$'s trailing edge during play startup); ICE, an active high input clock enable signal that, when active, allows passage of the WR CLK signal (ICE is set on the leading edge of $\overline{FRAME\ PULSE}$ during play startup); PM, an active high signal indicating when the system is in the play mode; and $\overline{RM}$, an active high signal indicating when the system is in the record mode.

The following output signals are related to the input signals in the indicated manner:

OCE=$\overline{REC}$ and OCE and $\overline{FLDE}$ or $\overline{REC}$ and OCE and FLL or $\overline{REC}$ and OCE and ICE or $\overline{REC}$ and OCE and PM or MR;

ICE=$\overline{REC}$ and ICE and PM or $\overline{REC}$ and ICE and $\overline{FRAMEPULSE}$ or MR;

RM=$\overline{REC}$ and MR or $\overline{REC}$ and RM;

PM=$\overline{PLAY}$ and MR or $\overline{PLAY}$ and PM; and

MR=MR and $\overline{PLAY}$ and $\overline{REC}$ or STOP or POR or PLAY and $\overline{RM}$ or REC and $\overline{PM}$ or $\overline{OCE}$.

The 16R8 integrated circuit identified by numeral "I" in FIG. 7 is the input sample clock ($\overline{RCS}$) generator. Chip I also sends resets to the write address counter as required to adjust for clock phase variations in turn required by the asynchronous nature of the input 1553B data. The input signals to chip I are: A, indicative of activity on the input; $\overline{LL}$, a last line flag received from line counter circuit II (to be discussed below); PM, a play mode signal that is active high (i.e., it is high in the play mode and low for the stop and record modes); $\overline{FRAMEPULSE}$, described above with reference to main state machine III; ODD, a signal indicative of the field sense (received from flip flop LS74 circuit 102 shown in FIG. 8, in which it is generated from the $\overline{VSYNC}$ and $\overline{FRAMEPULSE}$ sync signals generated by sync generator 3 of FIG. 1); and CLK, a 16 MHz crystal clock signal. Chip I outputs the following: $\overline{RCS}$, a 2 MHz read clock signal used for the purposes described above (and which comprises counter bits $C_0$ (least significant bit), $C_1$, and $C_2$ (most significant bit)); and $\overline{WCR}$, a write counter reset signal, which is pulsed on the last line of a frame during the record mode and follows $\overline{FRAMEPULSE}$ during the playback mode. Chip I also generates the following internally used signals: AL, an activity latched signal (latched to activity signal A) for synchronous behavior; ALD, an activity latched-delayed signal; and LLD, a last-line delayed signal used as an edge detector for the $\overline{WCR}$ signal.

The following output signals are related to the input signals in the indicated manner:

$C_0 = \overline{C_0}$ and $\overline{AL}$ or $\overline{C_0}$ and AL and ALD;

$C_1 = $ AL and $\overline{ALD}$ or $C_0$ and $\overline{C_1}$ or $\overline{C_0}$ and $C_1$;

$C_2 = C_0$ and $C_1$ and $\overline{C_2}$ and $\overline{AL}$ or $C_0$ and $C_1$ and $\overline{C_2}$ and AL and ALD or $\overline{C_1}$ and $C_2$ and $\overline{AL}$ or $\overline{C_1}$ and $C_2$ and AL and ALD or $\overline{C_0}$ and $C_1$ and $C_2$ and $\overline{AL}$ or $\overline{C_0}$ and $C_1$ and $C_2$ and AL and ALD; and $\overline{WCR}$ = LL and $\overline{LLD}$ and $\overline{PM}$ and $\overline{A}$ and $\overline{AL}$ and $\overline{ALD}$ and $\overline{ODD}$ or FRAMEPULSE and PM.

The 16R4 integrated circuit identified by numeral II in FIG. 8 is denoted the "line counter logic." This chip takes the 8-bit count of lines ($Q_0$-$Q_8$) and generates control pulses for the other logic elements of FIGS. 7-9. This chip also gates the negative true white flag pulse ($\overline{RWF}$) from write sample counter logic circuit III (to be discussed below). The input signals to chip II are: counter bits $S_0$ (the least signficant bit) through $S_7$ (the most signficant bit) of the line counter; field sense signal ODD from circuit 102 (shown in FIG. 8); and raw white flag signal $\overline{RWF}$. The output signals from chip II are: ZD, a zero detect signal for the clearing function logic (identified as element 108 in FIG. 8); LINE ENABLE, a clock signal which is supplied to the sampler logic 110 (which logic includes the above-mentioned LS157 sampler integrated circuit); $\overline{FL}$, an active low "first line" signal indicating that line thirteen has occurred; $\overline{LL}$, an active low last line signal indicating that the 249th line has occurred; and $\overline{WF}$, the gated white flag signal.

The output signals are related to the input signals as follows:

ZD = $\overline{S_7}$ and $\overline{S_6}$ and $\overline{S_5}$ and $\overline{S_4}$ and $\overline{S_3}$ and $\overline{S_2}$ and $\overline{S_1}$ and $\overline{S_0}$;

LINE ENABLE = $\overline{S_7}$ and $\overline{S_6}$ and $\overline{S_5}$ and $\overline{S_4}$ and $S_3$ and $S_2$ and $\overline{S_1}$ and $\overline{S_0}$ or LINE ENABLE and $\overline{LL}$;

WF = RWF and LINE ENABLE;

LL = $S_7$ and $S_6$ and $S_5$ and $S_4$ and $S_3$ and $\overline{S_2}$ and $\overline{S_1}$ and $\overline{S_0}$;

FL = $\overline{S_7}$ and $\overline{S_6}$ and $\overline{S_5}$ and $\overline{S_4}$ and $S_3$ and $S_2$ and $\overline{S_1}$ and $S_0$.

The 16R4 integrated circuit identified by numeral IV in FIG. 8 is the read sample counter logic, which handles the counter set for enabling the read counter. Counter bits $S_0$ (the least significant bit) through $S_7$ (the most significant bit) are received by chip IV. The chip counts out 141 samples per (horizontal) line, except for the last line where either 61 samples (for an even field) or 62 samples (for an odd field) are counted out. Time is allowed for the white flag pulses by ending on the real count, not one sample early. The input signals to chip IV are: counter bits $S_0$ through $S_7$; LL, the inverse of signal $\overline{LL}$ that emerges from chip II; ODD, the field sense; and EDGE IN, an edge detected flag received from logic element 109 of FIG. 8. The output signals emerging from chip IV are: $\overline{PLL}$, a pulsed last line signal that detects either sample 140, sample 60, or sample 61; $\overline{RSCENAB}$, the read sample enable signal that causes sampler 110 to accept incoming samples; and $\overline{EGATE}$ a signal allowing the video sample clock logic (which includes chip V) to look for white-flagged data ("IVDATA") played back from the VTR.

The output signals are related to the input signals as follows:

$ZD = \overline{S_7}$ and $\overline{S_6}$ and $\overline{S_5}$ and $\overline{S_4}$ and $\overline{S_3}$ and $\overline{S_2}$ and $\overline{S_1}$ and $\overline{S_0}$ and $\overline{ZD}$;

$EGATE = \overline{RSCENAB}$ and $\overline{S_7}$ and $\overline{S_6}$ and $\overline{S_5}$ and $S_4$ and $\overline{S_3}$ and $S_2$ and $\overline{S_1}$ and $S_0$ are $\overline{EDGEIN}$ and $\overline{EGATE}$ and $\overline{RSCENAB}$ and $EGATE$ and $\overline{PLL}$;

$RSCENAB = (EDGEIN$ and $EGATE)$ or $(RSCENAB$ and $\overline{PLL})$;

$PLL = \overline{LL}$ and $S_7$ and $\overline{S_6}$ and $\overline{S_5}$ and $\overline{S_4}$ and $S_3$ and $S_2$ and $\overline{S_1}$ and $S_0$ or $LL$ and $\overline{ODD}$ and $\overline{S_7}$ and $\overline{S_6}$ and $S_5$ and $S_4$ and $\overline{S_3}$ and $S_2$ and $S_1$ and $S_0$ or $LL$ and $ODD$ and $\overline{S_7}$ and $\overline{S_6}$ and $S_5$ and $S_4$ and $S_3$ and $S_2$ and $S_1$ and $\overline{S_0}$.

The 16R8 integrated circuit identified by numeral V is the dual video sample clock generator. One side of chip V generates video record clock signal (VRCS) for the output of data from memory; the other side generates video playback clock signal (VPBSC) for the input of data to memory. Signals VPBSC and VRSC have frequency equal to 2.67 MHz. The state machines of both sides of chip V are substantially identical, but the surrounding circuitry is different. The input signals to chip V are: CLK, a 16 MHz crystal clock signal; the inverse, MR, of master reset signal $\overline{MR}$ (from chip III of FIG. 7); and reset signals $R_x$ and $R_y$ from the LS74 integrated circuits identified as elements 113 in FIG. 8. The output signals from chip V are: bits $Y_0$(lsb), $Y_1$, and $Y_2$ (msb) of VPBCS; bits $X_0$ (lsb), $X_1$, and $X_2$ (msb) of VRCS; $\overline{XR}$; and $\overline{YR}$.

The relationships between the input and output signals are:

$Y_0 = YR$ or $\overline{Y_1}$ and $\overline{Y_0}$ or $\overline{Y_2}$ and $Y_1$ and $\overline{Y_0}$;

$Y_1 = Y_2$ and $\overline{Y_1}$ and $Y_0$ and $\overline{YR}$ or $\overline{Y_2}$ and $Y_1$ and $\overline{Y_0}$ and $\overline{YR}$;

$Y_2 = \overline{Y_2}$ and $\overline{Y_1}$ and $Y_0$ and $\overline{YR}$ or $Y_2$ and $\overline{Y_1}$ and $\overline{Y_0}$ and $\overline{YR}$;

$YR = R_y$ or $MR$ or $R_x$;

$XR = R_x$ or $MR$;

$X_0 = \overline{X_1}$ and $\overline{X_0}$ and $\overline{XR}$ or $\overline{X_2}$ and $X_1$ and $\overline{X_0}$ and $\overline{XR}$;

$X_1 = X_2$ and $\overline{X_1}$ and $X_0$ and $\overline{XR}$ or $\overline{X_2}$ and $X_1$ and $\overline{X_0}$ and $\overline{XR}$;

$X_2 = \overline{X_2}$ and $\overline{X_1}$ and $X_0$ and $\overline{XR}$ or $X_2$ and $\overline{X_1}$ are $\overline{X_0}$ and $\overline{XR}$.

The integrated circuit identified by numeral VI on FIG. 8 is the write sample counter logic, which accepts the output ($S_0$ through $S_7$) of the eight bit binary counter that keeps track of how many data sample pulses one would have if the system sampled data all the time. Chip VI also includes a data gate for writing. Chip VI generates Raw White Flag signal ($\overline{RWF}$), which includes a negative pulse 9 microseconds (i.e., 9 data samples) after the leading edge of each HSYNC pulse (HSYNC is the 15,748 Hz sync signal supplied by sync generator 3 of FIG. 1). The data emerging from the buffer memory to be recorded on a VTR (after it is added to gated white flag signal $\overline{WF}$) consists of low voltage samples until the white flag time (9 microseconds after $\overline{HSYNC}$'s leading edge), after which time 141 samples of real data emerge (unless a last line is being read from the buffer memory, in which case 61 or 62 samples emerge). The input signals to chip VI are: clock signal VRSC from chip V; bits $S_0$ (lsb) through $S_7$ (msb) of the binary counter mentioned earlier in this paragraph (note that the binary counter is also driven by clock signal VRSC, making it operate synchronously with chip VI); LL, the inverse of the signal $\overline{LL}$ emerging from chip II; ODD, the field sense signal from element 102 of FIG. 8. The output signals from chip VI are: $\overline{ZD}$, a zero detector used by element 121 for counter resetting; $\overline{RWF}$, the raw white flag pulse; and $\overline{RECENAB}$, an inverted clock enable supplied to sample 110 to cause sampler 110 to write data into the buffer memory.

The output signals are related to the input signals as follows:

$ZD = \overline{S_7}$ and $\overline{S_6}$ and $\overline{S_5}$ and $\overline{S_4}$ and $\overline{S_3}$ and $\overline{S_2}$ and $\overline{S_1}$ and $\overline{S_0}$;

$RWF = \overline{S_7}$ and $\overline{S_6}$ and $\overline{S_5}$ and $S_4$ and $S_3$ and $\overline{S_2}$ and $\overline{S_1}$ and $\overline{S_0}$;

$RECENAB = RECENAB$ and $\overline{PEND}$ or $\overline{S_7}$ and $\overline{S_6}$ and $\overline{S_5}$ and $S_4$ and $S_3$ and $\overline{S_2}$ and $\overline{S_1}$ and $S_0$, where $PEND = \overline{LL}$ and $S_7$ and $\overline{S_6}$ and $\overline{S_5}$ and $\overline{S_4}$ and $\overline{S_3}$ and $S_2$ and $\overline{S_1}$ and $S_0$ and $LL$ and $\overline{ODD}$ and $\overline{S_7}$ and $S_6$ and $\overline{S_5}$ and $S_4$ and $\overline{S_3}$ and $S_2$ and $\overline{S_1}$ and $S_0$ or $LL$ and $ODD$ and $\overline{S_7}$ and $S_6$ and $\overline{S_5}$ and $S_4$ and $\overline{S_3}$ and $S_2$ and $S_1$ and $\overline{S_0}$.

The integrated circuit identified by numeral VII on FIG. 7 is the transmit enable resetter, which enables the transmitter circuitry of 1553B receiver/transmitter 1,31 of FIG. 7. As recovered data (RDATA) emerges from buffer memory 10,24 (after being recovered from recorded video signal IVDATA), the 1553B transmitter's one shot circuit will start whenever a zero to one transition is seen on the RDATA line. Chip VII looks ahead for an excessively long sequence of zeros or ones. If such a long sequence is found, the very next clock pulse causes the one shot to be reset. The input signals to chip VII are: bits "IN" of RDATA; read clock signal RDCLK; and master reset signal $\overline{MR}$. The output signals are:

$Q = \overline{DL4}$ (where $DL4 = DL3$ and $\overline{MR}$, $DL3 = DL2$ and $\overline{MR}$, $DL2 = DL1$ and $\overline{MR}$, $DL1 = IN$ and $\overline{MR}$); and $QINV = DL4$; and $\overline{OSR}$, where $OSR = \overline{IN}$ and $\overline{DL1}$ and $\overline{DL2}$ and $\overline{DL3}$ and $\overline{DL4}$ or $IN$ and $DL1$ and $DL2$ and $DL3$ and $DL4$ or $MR$.

Sampler circuitry 110 (including sampler IC LS157) will write data (denoted as "WRITE SERIAL DATA" in FIG. 7) into buffer memory 10,24 (of FIG. 9) in both the system's playback mode and the system's record mode. In the record mode, sampler 110 will write the synchronized data emerging from circuit 100 (of FIG. 7) into buffer memory, and will output a 2 MHz write clock signal "WR CLK" to the buffer memory. In the record mode, sampler 110 will also output a 2.67 MHz read clock signal "RD CLK" (derived from signal VRSC) to the buffer memory (and to LS74 integrated circuit 101 of FIG. 9). Thus, in the record mode, the "R DATA" clocked out of buffer memory LS74 by integrated circuit 101 (of FIG. 9) will consist of bursts of 2.67 Mbit/sec data samples occupying the active video regions of a television-type signal.

In the playback mode, sampler 110 will write the "IVDATA" emerging from the data separator portion of the FIG. 4 circuitry into buffer memory, and will output a 2.67 MHz write clock signal "WR CLK" (derived from signal VPBSC) to the buffer memory. In the playback mode, sample 110 will also output a 2 MHz read clock signal "RD CLK" (derived from the 2 MHz crystal signal emerging from crystal clock 2 of FIG. 3) to buffer memory 10,24 and to integrated circuit 101 (of FIG. 9). Thus, in the playback mode, the "R DATA" clocked out of the buffer memory by IC 101 will consist of a stream of 2 MHz data pulses which enter the 1553B transmitter via chip VII.

Integrated circuit 74129 (identified as circuit element 130 of FIG. 7) will inhibit the 1553B transmitter from transmitting "R DATA" during the system's record mode, and conversely will enable the transmitter to transmit "R DATA" during the system's playback mode.

The foregoing description is merely illustrative and explanatory of the inventive system and method. Various changes in details of the method and system described herein may be within the scope of the appended claims.

We claim:

1. A method for recording an asynchronous, biphase encoded signal having a first data rate, including the steps of:
    (a) synchronizing the signal with a first clock signal having a frequency substantially equal to twice the first data rate;
    (b) temporarily storing the synchronized signal in a first buffer memory as if it were an NRZ bit stream having a bit rate substantially equal to twice the first data rate;
    (c) generating television-type synchronization pulses;
    (d) combining the stored synchronized signal with the television-type synchronization pulses to produce a television-type signal having un-decoded biphase data occupying its active video areas; and
    (e) recording the television-type signal on a video tape recorder.

2. The method of claim 1, wherein the first data rate is substantially equal to 1 Megabit per second.

3. The method of claim 1, wherein the biphase encoded signal has U.S. Government MIL-STD-1553B format.

4. The method of claim 1, wherein step (a) comprises the step of combining the television-type synchronization pulses with the stored signal in such a manner that the resulting television-type signal has an NTSC format, modified so that the horizontal sweep rate is 15,748 Hz and the field frequency is 29.996 Hz.

5. A method of claim 1, wherein step (a) comprises the step of deriving the first clock signal from a crystal clock.

6. The method of claim 1, wherein step (d) includes the substeps of:
    clocking bursts of the stored synchronized signal out of the first buffer memory using a second clock signal having frequency substantially greater than twice the first data rate; and
    inserting television-type synchronization pulses between the bursts of the stored synchronized signal.

7. The method of claim 1, also including the steps of:
    (f) separating the recorded television-type signal into its un-decoded biphase data component and its synchronization pulse component;
    (g) temporarily storing the biphase data component in a second buffer memory; and
    (h) clocking the biphase data component out of the second buffer memory using a second clock signal having frequency substantially equal to twice the first data rate.

8. The method of claim 7, wherein the first clock signal is derived from a crystal clock, and the second clock signal is also derived from the crystal clock.

9. The method of claim 7, wherein step (d) includes the substeps of:
    clocking bursts of the stored synchronized signal out of the first buffer memory using a third clock signal having frequency substantially greater than twice the first data rate; and
    inserting television-type synchronization pulses between the bursts of the stored synchronized signal.

10. The method of claim 9, also including the steps of:
    generating timing and control signals, and a fourth clock signal having a frequency substantially equal to that of the third clock signal, from the data component and the synchronization pulse component; and
    clocking the data portion into the second buffer memory using the fourth clock signal.

11. The method of claim 10, wherein the second clock signal is also generated from the data component and the synchronization pulse component.

12. A system for recording an asynchronous, biphase encoded signal having a first data rate, including:
    (a) synchronizing means capable of synchronizing the biphase endoded signal with a first clock signal having a first clock frequency substantially equal to twice the first data rate;
    (b) means, including a first buffer memory, for temporarily storing the synchronized signal as if it were an NRZ bit stream having a bit rate substantially equal to the first clock frequency;
    (c) a source of television-type synchronization pulses; and
    (d) means for combining the temporarily stored synchronized signal with the television-type synchronization pulses to produce a television-type signal, having un-decoded biphase data occupying its active video areas and capable of being recorded on a video tape recorder.

13. The system of claim 12, also including:
    (e) means for separating the television-type signal upon playback from an external video tape recorder into its un-decoded biphase data component and its synchronization pulse component;
    (f) means, including a second buffer memory, for temporarily storing the data component; and
    (g) means for clocking the data component out of the buffer memory at the first clock frequency.

14. The system of claim 13, wherein the first buffer memory and the second buffer memory are one and the same.

15. The system of claim 12, also including:
    means for clocking the temporarily stored synchronized signal out of the first buffer memory at a second clock frequency substantially greater that the first clock frequency, so that the television-type signal has a bit stream having data rate equal to the second clock frequency occupying at least one of its active video areas.

16. The system of claim 12, wherein the biphase encoded signal has MIL-STD-1553B format.

17. The system of claim 16, wherein the combining means produces a television-type signal, having an NTSC format, modified so that the horizontal sweep rate is 15,748 Hz and the field frequency is 29.996 Hz.

18. A system for generating an asynchronous, biphase encoded signal having a first data rate, and suitable for recording on a video tape recorder including:
- (a) synchronizing means capable of synchronizing the biphase encoded signal with a first clock signal having a first clock frequency substantially equal to twice the first data rate;
- (b) a first buffer memory;
- (c) means for writing the synchronized signal into the first buffer memory;
- (d) a source of television-type synchronization pulses; and
- (e) means for clocking the synchronized signal out of the first buffer memory and combining it with the synchronization pulses to produce a television signal having un-decoded biphase encoded data occupying its active video areas.

19. The system of claim 1, also including:
means for clocking bursts of the stored synchronized signal out of the first buffer memory using a second clock signal having frequency substantially greater than twice the first data rate; and
means for inserting television-type synchronization pulses between the bursts of the stored synchronized signal.

20. The system of claim 18, also including means for recovering the biphase encoded data from the television signal after it has been recorded.

21. The system of claim 20, wherein the recovering means includes:
means for separating the recorded television signal into its undecoded, biphase encoded data component and its synchronization pulse component;
means, including a second buffer memory, for temporarily storing the biphase encoded data component; and
means for clocking the temporarily stored biphase data component out of the second buffer memory using a second clock signal having frequency substantially equal to the first clock frequency.

22. The system of claim 21, wherein the first clock signal and the second clock signal are derived from a common crystal clock.

23. The system of claim 21, also including
means for clocking bursts of the stored synchronized signal out of the first buffer memory using a third clock signal having frequency substantially greater than twice the first data rate; and
means for inserting television-type synchronization pulses between the bursts of the stored synchronized signal.

24. The system of claim 23, also including:
means for generating timing and control signals, and a fourth clock signal having frequency substantially equal to that of the third clock signal, from the biphase data component and the synchronization pulse component; and
means for clocking the biphase position into the second buffer memory using the forth clock signal and the timing and control signals.

25. The system of claim 22, also including means for generating the second clock signal from the biphase data component and the synchronization pulse component.

26. The system of claim 21, wherein the first buffer memory and the second buffer memory are one and the same buffer memory.

27. The system of claim 18, wherein the biphase encoded signal has U.S. Government MIL-STD-1553B format.

28. The system of claim 19, wherein the biphase encoded signal has U.S. Government MIL-STD-1553B format.

29. The system of claim 28, wherein the frequency of the second clock signal is substantially equal to 2.67 MHz.

* * * * *